Patented July 14, 1953

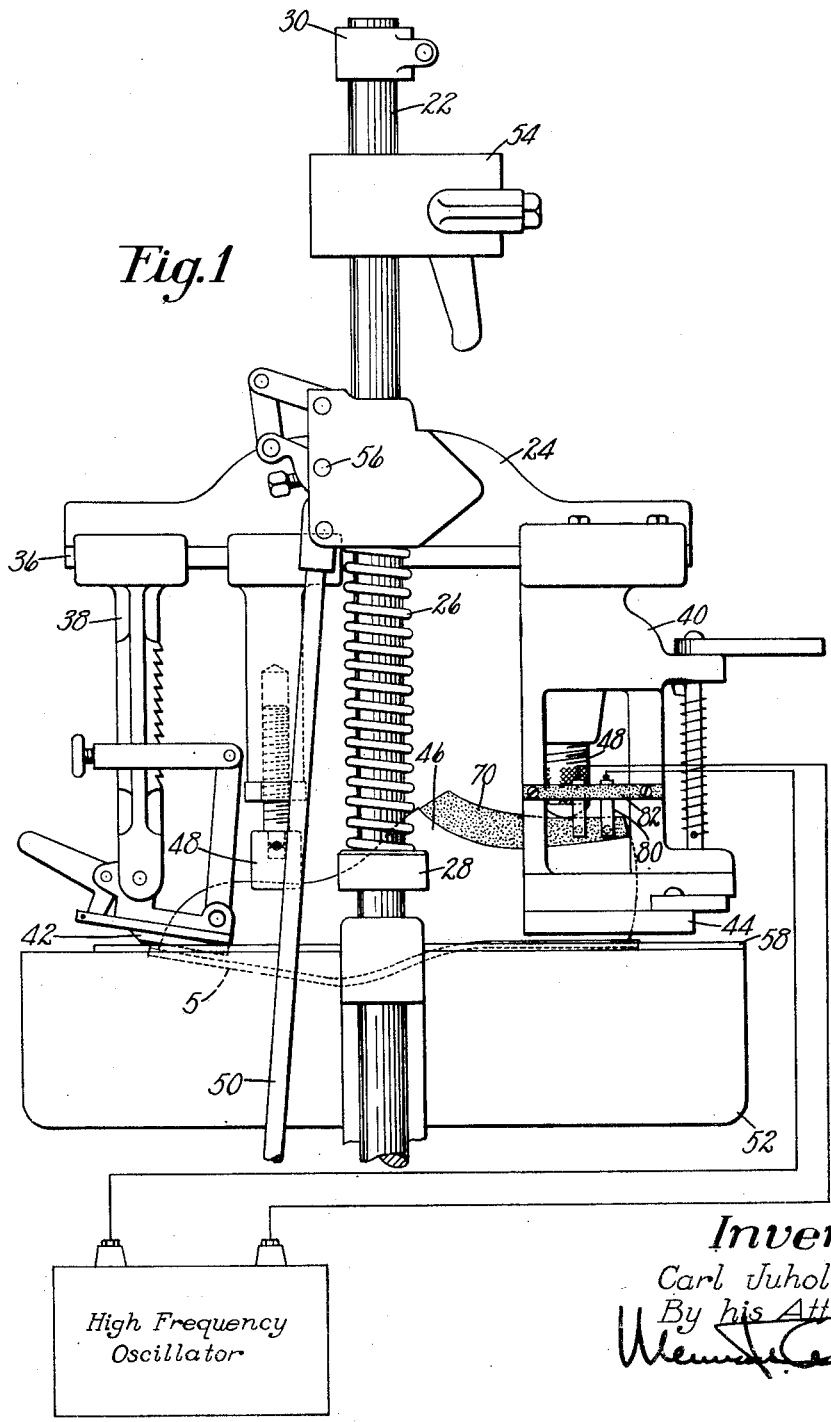

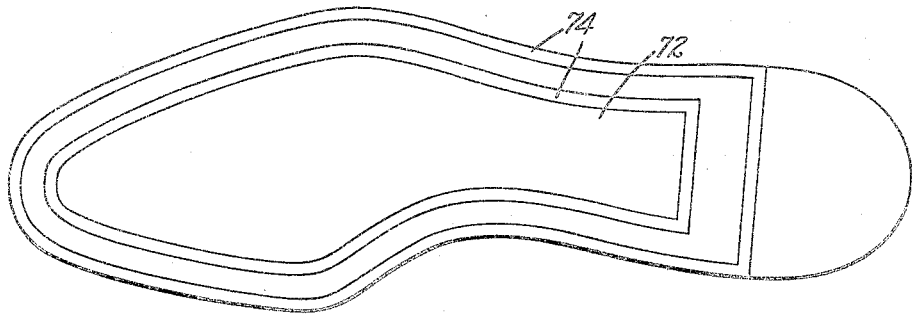
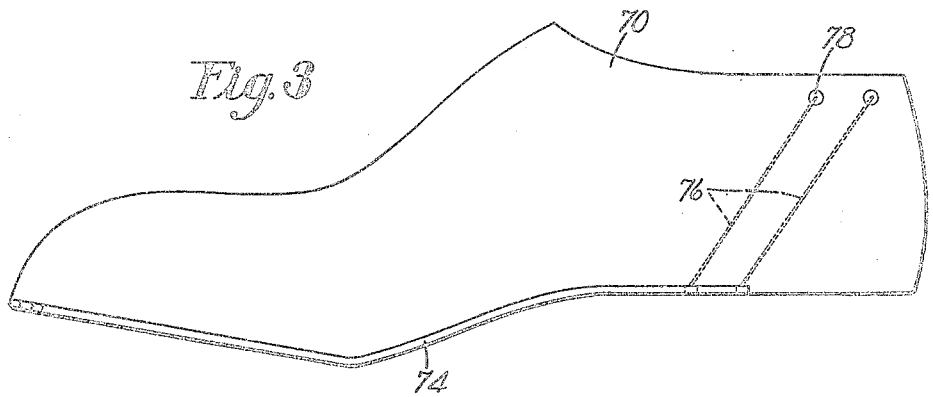

2,644,966

UNITED STATES PATENT OFFICE 2,644,966

APPARATUS FOR DIELECTRIC ADHESIVE BONDING OF SHOE PARTS

Carl Juhola, Manchester, Mass., assignor to United Shoe Machinery Corporation, Flemington, N. J., a corporation of New Jersey Application April 14, 1950, Serial No. 156,016

3 Claims. (Cl. 12—33.2)

This application relates to apparatus for securing soles to shoes and more particularly to apparatus for adhesively securing soles to shoes in which dielectric heat is employed to treat the adhesive.

In the attachment of soles to shoes by means of an interposed adhesive, it has frequently been found desirable to treat the adhesive layer with a high-frequency electric field prior to or during the application of pressure. The heat generated by the field in the adhesive serves to produce or accelerate a tacky condition of the adhesive, which action will be referred to herein as "activating the adhesive." Activation may take the form, for example, of softening a layer of thermoplastic adhesive so that it may coalesce with another similar layer or of driving off a solvent from a solvent-type adhesive.

While the desirability of such activation has long been known, great difficulty has been experienced in providing, in bonding apparatus adapted simultaneously to activate all areas of the adhesive, electrodes which are adapted to establish a uniform electric field throughout the entire extent of adhesive layer and which may be disposed conveniently in their proper location. In many of the present forms of apparatus proposed for such bonding, a rather critical adjustment of the electrodes is required, particularly where different sizes and styles of shoes are treated.

It is accordingly an object of the invention to provide improved apparatus for such dielectrically-activated adhesive bonding of soles to shoes whereby the necessity of adjusting the disposition of electrodes from shoe to shoe for different sizes and styles is obviated.

Another object of the invention is the provision of an improved electrode system for use in such apparatus, which system is simple, compact and in which the electrodes are permanently adjusted in proper disposition with respect to a shoe to establish a uniform electric field throughout a layer of adhesive adjacent to the margin of the shoe bottom.

Other features and advantages of the invention will best be understood by reference to a particular embodiment hereinafter described in the specification taken in connection with the accompanying drawings, in which Fig. 1 is a side elevation of an apparatus embodying the invention;

Fig. 2 is a plan view of the bottom of a shoe last embodying the invention; and

Fig. 3 is a side elevation of the last shown in Fig. 2.

In Fig. 1 the invention is illustrated as embodied in a machine of the type disclosed in United States Letters Patent No. 1,142,557, granted June 8, 1915, on an application of Karl Engel, which machine is adapted to support a lasted shoe and a sole in registering engagement and to apply pressure to bring together the sole and the shoe.

The machine comprises a base (not shown) in which two vertical guide rods 22 are rigidly mounted. A crosshead 24 vertically movable between the guide rods is normally supported in a raised position by springs 26 bearing upon collars 28 affixed to the guide rods. At the tops of the rods stop collars 30 are secured to limit the upward movement of the crosshead. Carried upon flanges or guides 36 upon the crosshead are supports 38 and 40 for shoe supporting jaws 42 and 44, respectively, constructed to support the toe and heel end of a lasted shoe 46 while abutments 48 engage the top of the toe and the crown of the last.

By means of rods 50 connected to a treadle (not shown) in the base, the crosshead may be depressed to press the shoe against a sole S on a pad support 52 in which position the crosshead may be held by clutch collars 54. Power means (not shown) are provided for raising the pad support 52 to press the sole firmly against the shoe. The crosshead is provided with mechanism actuated by a handle connected to a rock shaft 56 for releasing the clutch collars when desired. The pad support 52 is provided with sole positioning members 58 by which the sole may be held in register with a shoe in the jaws 42, 44.

A feature of the invention which is adapted to cooperate, in sole attaching, with pressure means such as the above described mechanism, comprises a novel shoe last 70 which, as shown in Figs. 2 and 3, comprises a bottom portion 72 of insulating material and embodies a pair of elongated electrically conductive members 74 spaced apart and extending around at least the forepart of the last in the marginal zone thereof. Conveniently, these electrode members may be constructed, for example, by inlaying copper strips in the bottom of a wooden last. Power leads 76 connected respectively to one and the other of the pair of electrode members 74 extend through the heel portion of the last to the rear cone, terminate in exposed contact surfaces 78 and thus provide means for connecting the electrodes to a source of high-frequency electric energy. As shown in Fig. 1, contact members 80 are attached, in a position to engage the contact surfaces 78, to a member 82 of insulating material secured to the support 40 and are connected to a high-frequency oscillator. When so energized, the electrodes are adapted to establish a high-frequency electric field (commonly called a "stray field") in a marginal portion of the shoe bottom beneath the electrodes and in the adhesive layer adjacent to this portion.

It will be seen from Fig. 1 that the electrodes are permanently positioned in a favorable location for dielectrically heating the adhesive through the relatively thin insole without need for external supports, spacers or insulators. Further, it will be seen that this disposition minimizes power wasted in heating shoe parts inside the attaching surfaces.

In operation, starting with the crosshead 24 in raised position, the operator positions a shoe 46 previously lasted over a last similar to last 70 between the supporting jaws 42 and 44 with the contact surfaces 78 engaging the contact members 80 and, if necessary, adjusts the abutments 48 to bear against the shoe toe and the crown of the last. A sole is placed upon the pad in the pad support 52 in register with the shoe where it is held by the positioning members 58. Preferably both shoe and sole have upon their attaching surfaces a previously applied and dried coating of thermoactive adhesive. The crosshead is then moved down by the treadle to cause the shoe to engage the sole, and the support 52 is then raised by the power means to press the sole firmly against the shoe. High-frequency energy is then supplied to the electrodes from the oscillator for a period sufficient to activate the adhesive.

While I have thus disclosed my invention by a description of one specific embodiment thereof, I do not intend my invention to be limited thereby since many variations within the scope of the invention will readily occur to those skilled in the art. I wish my invention to be limited only by the limitations specified in the appended claims.

Having thus described my invention, what I claim as new and desire to secure by Letters Patent of the United States is:

1. In apparatus for attaching soles to shoes, means for supporting a shoe, means for supporting a sole in registering engagement with said shoe with a layer of adhesive between the attaching surfaces of the shoe and sole, a last having on its bottom margin a pair of electrodes permanently mounted in spaced parallel relation with each other and adapted to be received in said shoe for establishing an electric field in the adhesive, and means for connecting the electrodes to a source of high-frequency electric energy.

2. A shoemaker's last having a bottom portion comprising insulating material and embodying a pair of parallel elongated electrically conductive members spaced apart and extending around at least the entire forepart of the last in the marginal zone thereof, and means including terminals mounted in the cone of the last for connecting said members to a source of high-frequency electric energy.

3. A shoemaker's last having a bottom portion comprising insulating material and embodying a pair of spaced electrode members arranged one inside the other around the entire margin of the forepart of the last to establish a high-frequency electric field in the forepart of a shoe in a marginal portion of the shoe bottom, and means for connecting said members to a source of high-frequency electric energy.

CARL JUHOLA.

References Cited in the file of this patent

UNITED STATES PATENTS

| Number | Name | Date |
|---|---|---|
| Re. 22,301 | Pitman | Apr. 13, 1943 |
| 39,104 | White | June 30, 1863 |
| 249,354 | Higley | Nov. 8, 1881 |
| 616,113 | Kennedy | Dec. 20, 1898 |
| 1,142,557 | Engel | June 8, 1915 |
| 1,280,226 | Hooper | Oct. 1, 1918 |
| 2,228,136 | Hart, Jr. | Jan. 7, 1941 |
| 2,321,131 | Crandell | June 8, 1943 |